(No Model.)
A. C. HUNSBERGER.
TUBE CUTTER OR EXPANDER.
No. 265,086. Patented Sept. 26, 1882.
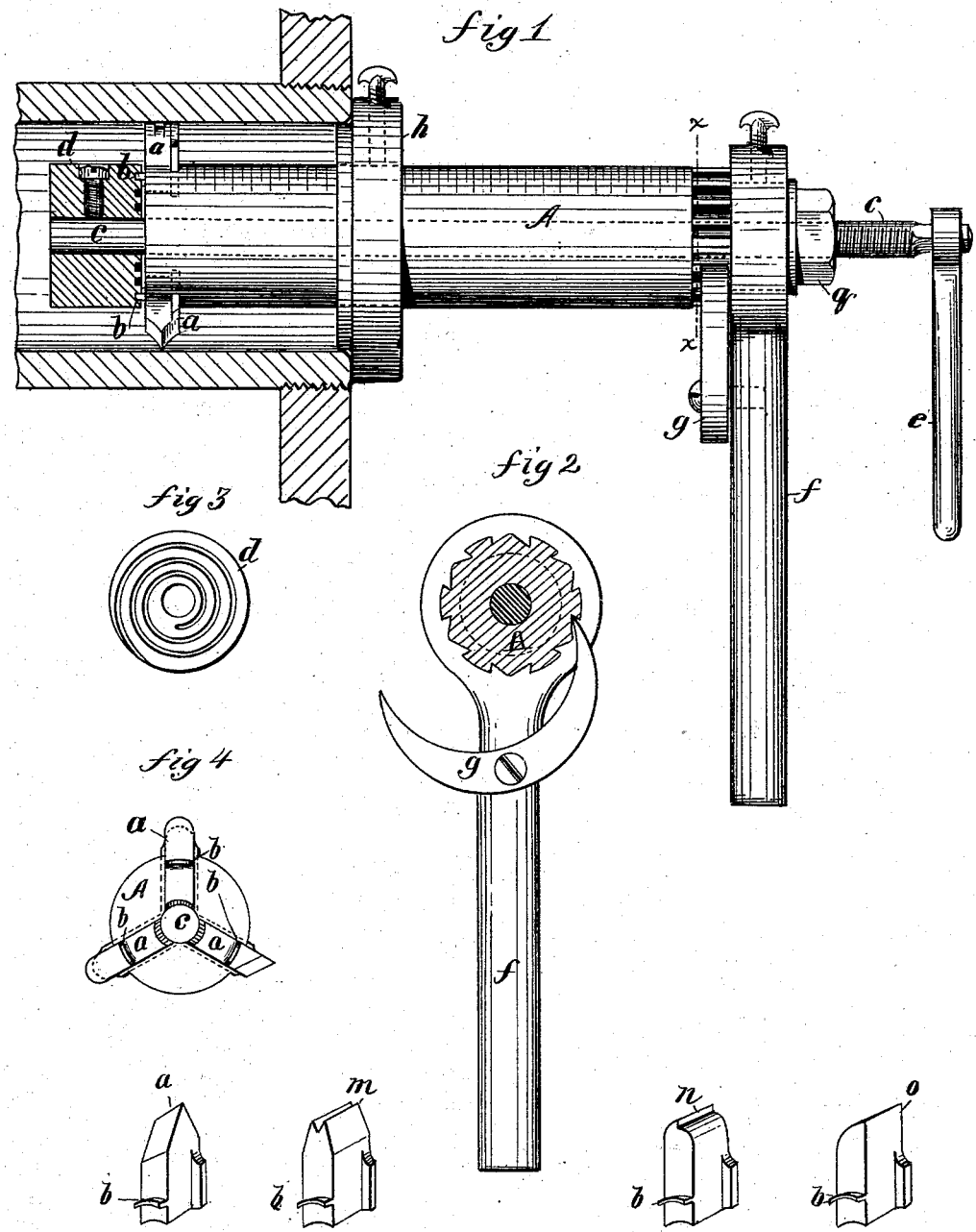
WITNESSES:
J. D. Garfield
C. Sedgwick
INVENTOR:
A. C. Hunsberger
BY Munn & Co
ATTORNEYS.

UNITED STATES PATENT OFFICE.

ABRAM C. HUNSBERGER, OF PORTLAND, PENNSYLVANIA.

TUBE CUTTER OR EXPANDER.

SPECIFICATION forming part of Letters Patent No. 265,086, dated September 26, 1882.

Application filed May 17, 1882. (No model.)

*To all whom it may concern:*

Be it known that I, ABRAM C. HUNSBERGER, of Portland, in the county of Northampton and State of Pennsylvania, have invented a new and useful Improvement in Tube Cutters or Expanders, of which the following is a full, clear, and exact description.

The usual method of removing tubes from boilers is to first split the end of the tube endwise and then bend the split end inward. This operation requires considerable time, and the ends of the tubes are often damaged for several inches.

The object of my invention is to provide a cutter that may be inserted within the tube and the end cut off closely to the tube-sheet, thereby leaving the end of the tubes in a shape for being again expanded without subsequent cutting; and to that end the invention consists of an inside tube-cutter constructed as hereinafter described and claimed.

Reference is to be had to the accompanying drawings, forming a part of this specification, in which similar letters of reference indicate corresponding parts in all the figures.

Figure 1 is a side elevation, partially sectional, of my improved cutter as applied to a tube for cutting. Fig. 2 is an end view in section on the line $x\ x$ of Fig. 1. Fig. 3 is a face view of the expanding block of the cutter. Fig. 4 is a view at the inner end of the cutting-tool. The other figures show different forms of cutters which are employed.

A is a round bar, having a central longitudinal aperture of comparatively small size and extending the entire length of the bar. At one end of the bar A it is formed with radial slots, preferably three in number, in which the chisels or cutting-tools $a$ are fitted, such cutters being provided on their inner ends with flanges or projections $b$.

$c$ is a rod passing through the bar A, and carrying at its end next to the cutters $a$ a block, $d$, which is formed on its inner face with a spiral groove that is engaged by the projections $b$ of the cutters. The block $d$ is attached by setscrews or any other suitable device firmly to the rod $c$. The rod $c$ projects also at the opposite end of the bar A, and is clamped to the bar by a set-nut, $q$, and it is provided with a wrench, $e$, by which it is to be turned for projection or withdrawal of the cutters $a$. At the outer end of the bar A is fitted a loose handle, $f$, on which is pivoted a double pawl, $g$, for engagement by either of its ends with ratchet-teeth formed upon bar A. Upon bar A is a loose ring, $h$, provided with a set-screw, by which it may be clamped upon the bar at any distance from the cutters, so as to take against the end of the tube that is being cut, to serve as a guide for the operation. The bar is marked on its surface to indicate inches and parts of inches, for convenience in using the tool.

This tool can be made of any suitable size, according to the size of the pipe or tube that is to be cut.

In operation the end of the bar A carrying cutters $a$ is inserted within the end of the tube until the ring $h$ takes against the tube or tube-plate, and the cutters are then expanded by turning the handle $e$ until they take against the inner surface of the tube. Then, by the use of the ratchet-handle $f$, the tube A is revolved, and the cutters thus caused to act upon the inner surface of the tube, and being expanded from time to time, as required, the tube is cut off by a straight, clean cut.

Different forms of cutters may be used, according to the work that is to be done.

For use as a pipe or nipple wrench the tool shown at $m$ will be used. This tool is provided with flanges extending lengthwise of the tube, so that when they are projected against the inner surface of the tube or nipple there is sufficient friction for them to retain their hold. This is specially useful for applying and removing nipples that are threaded their entire length, and which might be injured by the use of the tongs, and, further, for the removal of the broken ends of tubes, which either must be chiseled or cut out from the inside.

By using the tool shown at $n$ the inside of a tube or hole may be reamed out at any distance from the end, as desired.

By using the tool shown at $o$ the end of a tube of lead or other soft metal may be expanded, and the tool $p$ may be inserted and used as a tap for cutting through the thread.

When the tool is used as an expander advantages are secured in enlarging loose pipes at the fitting to insure tight joints, and boiler-tubes may be expanded just inside of the fluesheet. The tool will also be found useful in reaming out oil-chambers in the interior of wagon-wheel boxes and in other situations difficult of access. By these different adjustments all the requirements for the work of fitting and removing tubes are provided for.

Having thus described my invention, I claim as new and desire to secure by Letters Patent—

The combination of the radially-grooved hollow bar A, tools $a$, scroll-block $d$, and screw-threaded rod $c$ with the screw-nut $q$ for holding the tools $a$ in engagement with the scroll of the block $d$, as shown and described.

ABRAM C. HUNSBERGER.

Witnesses:
JONATHAN MOORE,
H. LEWIS BRANDS.